United States Patent
Saito (10) Patent No.: US 10,209,069 B2
(45) Date of Patent: Feb. 19, 2019

(54) OFFSET CALCULATION CIRCUIT AND AZIMUTH SENSOR USING THE SAME

(71) Applicant: Rohm Co., Ltd., Kyoto (JP)

(72) Inventor: Koji Saito, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 470 days.

(21) Appl. No.: 14/962,028

(22) Filed: Dec. 8, 2015

(65) Prior Publication Data

US 2016/0169673 A1  Jun. 16, 2016

(30) Foreign Application Priority Data

Dec. 11, 2014 (JP) .................................. 2014-250923

(51) Int. Cl.
*G01C 17/38* (2006.01)
(52) U.S. Cl.
CPC .................................. *G01C 17/38* (2013.01)
(58) Field of Classification Search
None
See application file for complete search history.

(56) References Cited

U.S. PATENT DOCUMENTS

| 7,069,663 | B2* | 7/2006 | Kwon | .................... G01C 17/38 33/356 |
| 8,437,970 | B2* | 5/2013 | Mayor | ............... G01R 33/0035 33/356 |
| 2005/0160609 | A1* | 7/2005 | Kwon | .................... G01C 17/38 33/356 |
| 2010/0312513 | A1* | 12/2010 | Mayor | ............... G01R 33/0035 702/104 |

FOREIGN PATENT DOCUMENTS

JP  4391416  10/2009

* cited by examiner

*Primary Examiner* — John E Breene
*Assistant Examiner* — Jeffrey C Morgan
(74) *Attorney, Agent, or Firm* — Fish & Richardson P.C.

(57) ABSTRACT

An offset calculation circuit comprising a data obtaining unit for sequentially obtaining two-axis or three-axis magnetic detection data as a set of data points of a two-axis coordinate system or a three-axis coordinate system; an offset recording unit for recording offset components of the magnetic detection data as an offset point of the two-axis coordinate system or the three-axis coordinate system; and an offset calculation unit for calculating a first reference line or a first reference plane put between first and second data points among the set of data points, and subsequently moving the offset point recorded in the offset recording unit in a direction toward the first reference line or the first reference plane to calculate a first offset candidate point.

20 Claims, 8 Drawing Sheets

OFFSET CALCULATION CIRCUIT AND AZIMUTH SENSOR USING THE SAME

CROSS-REFERENCE TO RELATED APPLICATION

This application is based upon and claims the benefit of priority from Japanese Patent Application No. 2014-250923, filed on Dec. 11, 2014, the entire contents of which are incorporated herein by reference.

TECHNICAL FIELD

The present disclosure relates to an offset calculation circuit and an azimuth sensor using the same.

BACKGROUND

An azimuth sensor (geomagnetic sensor) measures an azimuth by detecting a direction of geomagnetism. However, geomagnetism to be measured is very weak. Thus, in order to precisely detect an azimuth, it is necessary to detect a real geomagnetism by canceling an offset resulting from a magnetic field that is present in a surrounding environment (magnetic field generated within a set mounted with an azimuth sensor, a magnetic field generated by a powerful magnet placed around an azimuth sensor, or the like), or an offset resulting from the performance of an azimuth sensor itself.

An offset of an azimuth sensor is continuously changed temporally and spatially. Thus, in order to precisely detect an azimuth, it is required to quickly and continuously cancel an offset of the azimuth sensor.

An offset correction method includes a method for manually correcting an offset by a user who uses it on purpose and a method for automatically correcting an offset without a manual input from the user. Between the manual correction and the automatic correction, in consideration of enhancing the user convenience or detection precision of an azimuth sensor, it is preferable to employ the latter method.

In this regard, there was a prior method for automatically correcting an offset without a manual input from the user.

However, in this prior method, a large amount of operation is required to process the offset correction, and thus, in order to quickly and continuously cancel an offset, a high level of operation capability is required.

SUMMARY

According to one embodiment of the present disclosure, there is provided an offset calculation circuit, including a data obtaining unit for sequentially obtaining two-axis or three-axis magnetic detection data as a set of data points of a two-axis coordinate system or a three-axis coordinate system, an offset recording unit for recording offset components of the magnetic detection data as an offset point of the two-axis coordinate system or the three-axis coordinate system, and an offset calculation unit for calculating a first reference line or a first reference plane put between first and second data points among the set of data points, and subsequently moving the offset point recorded in the offset recording unit in a direction toward the first reference line or the first reference plane to calculate a first offset candidate point (first configuration).

In the offset calculation circuit having the first configuration, the first reference line or the first reference plane may be a straight line or a flat plane connecting points at equal distances from the first and second data points (second configuration).

Further, in the offset calculation circuit having the first configuration, the offset calculation unit may calculate a second offset candidate point by referring to third and fourth data points among the set of data points, and one of the third and fourth data points is different from both of the first and second data points (third configuration).

Further, in the offset calculation circuit having the third configuration, the offset calculation unit may calculate a plurality of offset candidate points including the first and second offset candidate points based on the set of data points, the offset calculation circuit may further comprise an offset updating unit for overwriting an average value of the plurality of offset candidate points in the offset recording unit (fourth configuration).

The offset calculation circuit having the first configuration may further comprise an offset updating unit for overwriting the first offset candidate point in the offset recording unit (fifth configuration).

Further, in the offset calculation circuit having the third configuration, when a distance between third and fourth data points is shorter than a first predetermined value, the offset calculation unit may not calculate the second offset candidate point from the third and fourth data points or discard the second offset candidate point calculated from the third and fourth data points (sixth configuration).

Further, in the offset calculation circuit having the first configuration, the offset calculation unit may calculate a second reference line or a second reference plane put between third and fourth data points among the set of data points, and when a distance between the second reference line or the second reference plane and the offset point is longer than a second predetermined value, the offset calculation unit may not calculate a second offset candidate point from the third and fourth data points, discard the second offset candidate point calculated from the third and fourth data points, or set a movement distance of the offset point in a direction toward the second reference line or the second reference plane shorter than a predetermined distance when calculating the second offset candidate point (seventh configuration).

Further, in the offset calculation circuit having the first configuration, the offset calculation unit may calculate a second reference line or a second reference plane put between third and fourth data points among the set of data points, and subsequently move the offset point recorded in the offset recording unit in a direction toward the second reference line or the second reference plane to calculate a second offset candidate point, and when a distance between the second reference line or the second reference plane and the offset point is shorter than a third predetermined value, the offset calculation unit may calculate the second offset candidate point at a first frequency, and when the distance between the second reference line or the second reference plane and the offset point is longer than the third predetermined value, the offset calculation unit may calculate the second offset candidate point at a second frequency higher than the first frequency (eighth configuration).

According to another embodiment of the present disclosure, there is provided an azimuth sensor, a magnetic detection circuit for generating two-axis or three-axis magnetic detection data, the offset calculation circuit having the first configuration for calculating an offset of the magnetic detection data; an offset correction circuit for correcting the offset of the magnetic detection data; and an azimuth operation circuit for generating azimuth data from the corrected magnetic detection data (ninth configuration).

According to still another embodiment of the present disclosure, there is provided an electronic device including the azimuth sensor having the ninth configuration (tenth configuration).

According to still another embodiment of the present disclosure, there is provided an offset calculation circuit including a data obtaining unit for sequentially obtaining three-axis magnetic detection data as a set of data points of a three-axis coordinate system, an offset recording unit for recording offset components of the magnetic detection data as an offset point of the three-axis coordinate system, and an offset calculation unit for calculating a first reference line passing through a first region surrounded by first, second, and third data points among the set of data points, and subsequently moving the offset point recorded in the offset recording unit in a direction toward the first reference line to calculate a first offset candidate point (eleventh configuration).

In the offset calculation circuit having the eleventh configuration, the first reference line may be a straight line connecting points at equal distances from the first, second, and third data points (twelfth configuration).

Further, in the offset calculation circuit having the eleventh configuration, the offset calculation unit may calculate a second offset candidate point by referring to fourth, fifth, and sixth data points among the set of data points, and one of the fourth, fifth, and sixth data points may be different from all of the first, second, and third data points (thirteenth configuration).

Further, in the offset calculation circuit having the thirteenth configuration, the offset calculation unit may calculate a plurality of offset candidate points including the first and second offset candidate points based on the set of data points, the offset calculation circuit may further comprise an offset updating unit for overwriting an average value of the plurality of offset candidate points in the offset recording unit (fourteenth configuration).

The offset calculation circuit having the eleventh configuration may further comprise an offset updating unit for overwriting the first offset candidate point in the offset recording unit (fifteenth configuration).

Further, in the offset calculation circuit having the thirteenth configuration, when a distance between two points of the fourth, fifth, and sixth data points is shorter than a first predetermined value, the offset calculation unit may not calculate the second offset candidate point from the fourth, fifth, and sixth data points or discards the second offset candidate point calculated from the fourth, fifth, and sixth data points (sixteenth configuration).

Further, in the offset calculation circuit having the eleventh configuration, the offset calculation unit may calculate a second reference line passing through a second region surrounded by fourth, fifth, and sixth data points among the set of data points, and when a distance between the second reference line and the offset point is longer than a second predetermined value, the offset calculation unit may not calculate a second offset candidate point from the fourth, fifth, and sixth data points, discard the second offset candidate point calculated from the fourth, fifth, and sixth data points, or set a movement distance of the offset point in a direction toward the second reference line shorter than a predetermined distance when calculating the second offset candidate point (seventeenth configuration).

Further, in the offset calculation circuit having the eleventh configuration, the offset calculation unit may calculate a second reference line passing through a second region surrounded by fourth, fifth, and sixth data points among the set of data points, and subsequently move the offset point recorded in the offset recording unit in a direction toward the second reference line to calculate a second offset candidate point, and when a distance between the second reference line and the offset point is shorter than a third predetermined value, the offset calculation unit may calculate the second offset candidate point at a first frequency, and when the distance between the second reference line and the offset point is longer than the third predetermined value, the offset calculation unit may calculate the second offset candidate point at a second frequency higher than the first frequency (eighteenth configuration).

According to still another embodiment of the present disclosure, there is provided an azimuth sensor including a magnetic detection circuit for generating three-axis magnetic detection data, the offset calculation circuit having the eleventh configuration for calculating an offset of the magnetic detection data, an offset correction circuit for correcting the offset of the magnetic detection data, and an azimuth operation circuit for generating azimuth data from the corrected magnetic detection data (nineteenth configuration).

According to still another embodiment of the present disclosure, there is provided an electronic device including the azimuth sensor having the nineteenth configuration (twentieth configuration).

DETAILED DESCRIPTION

The present disclosure provides some embodiments of an offset calculation circuit capable of calculating an offset with a smaller amount of calculation than that of the prior method, and an azimuth sensor using the same.

<First Embodiment>

Figure 1:
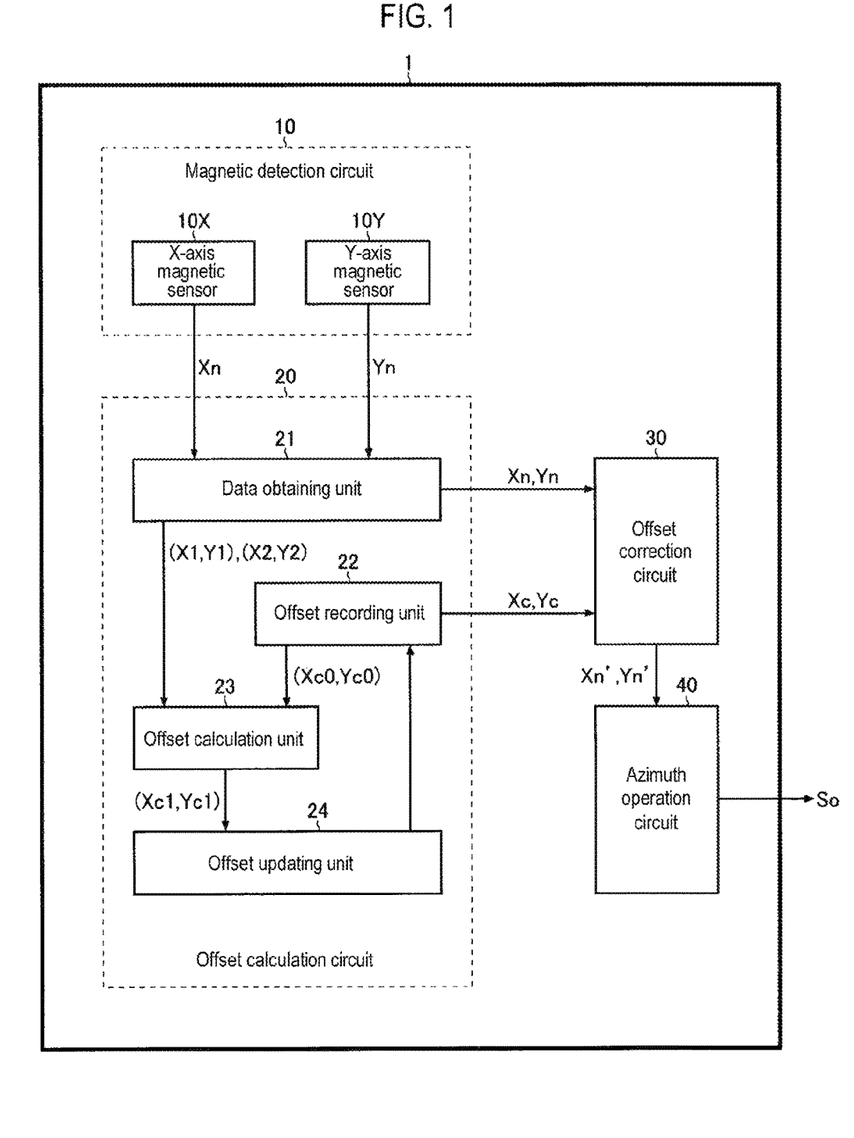
FIG. 1 is a block diagram illustrating a first embodiment of an azimuth sensor 1.

FIG. 1 is a block diagram illustrating a first embodiment of an azimuth sensor 1. The azimuth sensor 1 according to the first embodiment includes a magnetic detection circuit 10, an offset calculation circuit 20, an offset correction circuit 30, and an azimuth operation circuit 40.

The magnetic detection circuit 10 includes a magnetic sensor 10X for detecting a magnetism in an X axis direction and a magnetic sensor 10Y for detecting a magnetism in a Y axis direction, and generates two-axis magnetic detection data Xn and Yn (analog voltage signal). Further, as a magnetic detection element of the magnetic sensors 10X and 10Y, a hall element may be used or a magnetoresistance (MR) element may be used. Also, the X axis and the Y axis may be designed to be perpendicular to each other.

The offset calculation circuit 20 includes a data obtaining unit 21, an offset recording unit 22, an offset calculation unit 23, and an offset updating unit 24, and calculates offsets of the magnetic detection circuit 10 (offset components Xc and Yc included in the two-axis magnetic detection data Xn and Yn, respectively).

The data obtaining unit 21 obtains the two-axis magnetic detection data Xn and Yn as a data point (Xn, Yn) of a two-axis coordinate system. Further, the data obtaining unit 21 includes a driver for controlling driving of the magnetic sensors 10X and 10Y, an analog-to-digital (A/D) converter for converting the analog magnetic detection data Xn and Yn into a digital data point (Xn, Yn), and the like.

The offset recording unit 22 records the two-axis offset components Xc and Yc as an offset point (Xc, Yc) of the two-axis coordinate system in a non-volatile manner. As the offset recording unit 22, a nonvolatile semiconductor memory such as an electrically erasable programmable read-only memory (EEPROM) or a flash memory may be used.

The offset calculation unit 23 calculates a reference line F11 dividing two points (X1, Y1) and (X2, Y2) among sequentially obtained data points (Xn, Yn), and then moves an old offset point (Xc0,Yc0) recorded in the offset recording unit 22 in a direction toward the reference line F11, thereby calculating a new offset candidate point (Xc1, Yc1). Also, the offset calculation method will be described in detail later.

The offset updating unit 24 overwrites the new offset candidate point (Xc1, Yc1) (or an average value of a plurality of calculated new offset candidate points) in the offset recording unit 22.

The offset correction circuit 30 corrects the magnetic detection data Xn and Yn using offset information (offset components Xc and Yc) read from the offset recording unit 22, thereby generating offset-corrected magnetic detection data Xn'(=Xn−Xc) and Yn'(=Yn−Yc).

The azimuth operation circuit 40 generates azimuth data So from the offset-corrected magnetic detection data Xn' and Yn'.

Also, in FIG. 1, the offset calculation circuit 20, the offset correction circuit 30, and the azimuth operation circuit 40 are illustrated as independent circuit blocks, but these circuit blocks may be unitarily implemented using a central processing unit (CPU), a digital signal processor (DSP), or the like.

Figure 2:
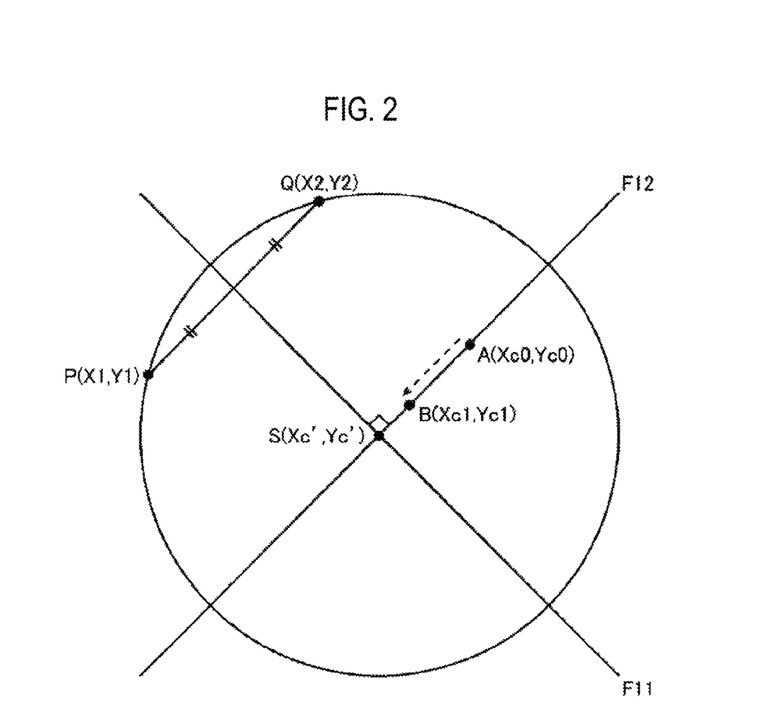
FIG. 2 is an XY coordinates plane view illustrating a first example of an offset calculation method.

FIG. 2 is a XY coordinates plane view illustrating a first example of the offset calculation method of the offset calculation unit 23.

When an offset is calculated according to the first example, first, certain two points (here, points P(X1, Y1) and Q(X2, Y2) among sequentially obtained data points (Xn, Yn) are selected.

Next, a reference line F11 dividing the point P and the point Q is calculated. For example, the reference line F11 may be a straight line linking points at equal distances from the point P and the point Q. In this case, the reference line F11 may be calculated using the following Eq. (1a) or (1b). Also, Eq. (1b) is an equation obtained by simplifying Eq. (1a).

$$(X - X1)^2 + (Y - Y1)^2 = \qquad \text{Eq. (1a)}$$
$$(X - X2)^2 + (Y - Y2)^2 \Leftrightarrow (X2 - X1) \cdot \left[X - \frac{X1 + X2}{2}\right] +$$
$$(Y2 - Y1) \cdot \left[Y - \frac{Y1 + Y2}{2}\right] = 0$$

$$|X - X1| + |Y - Y1| = |X - X2| + |Y - Y2| \qquad \text{Eq. (1b)}$$

The reference line F11 may be easily calculated by using the above Eq. (1a) or (1b). However, the reference line F11 may not necessarily be a straight line, and may be a curved line as long as it is put between the point P and the point Q.

Thereafter, a straight line F12 which passes through the old offset point A (Xc0, Yc0) recorded in the offset recording unit 22 and is perpendicular to the reference line F11 is calculated. Also, the straight line F12 may be easily calculated by using Eq. (2) as follows:

$$\frac{X - Xc0}{X2 - X1} = \frac{Y - Yc0}{Y2 - Y1} \qquad \text{Eq. (2)}$$

Thereafter, a new offset candidate point B (Xc1, Yc1) is calculated by moving the old offset point A in a direction toward the reference line F11.

For example, an intersection point S (Xc', Yc') between the reference line F11 and the straight line F12 is calculated, and a segment SA determined by the intersection point S and the old offset point A may be divided by m:n to calculate a new offset candidate point B.

Alternatively, the new offset candidate point B may also be calculated by moving the old offset point A toward the intersection point S by a movement distance d on the straight line F12. Also, when a distance between the old offset point A and the intersection point S is D, the movement distance d may be set within a range of 0<d<2D. That is, the new offset candidate point B may not necessarily be present on the segment SA, and may be set in a region beyond the reference line F11.

More generally speaking, the new offset candidate point B may only need to exist in a region belonging to the circle of the radius D around the intersection point S.

Thereafter, the offset calculation unit 23 repeatedly calculates a new offset candidate point B by newly referring to two data points of which at least one point is different from the two data points referred to in a previous time when the new offset candidate point B was calculated. For example, when the calculation of the new offset candidate point B is repeated within the shortest period, the point Q and the point R may be selected at a time when the third point R (X3, Y3) is obtained following the point P and the point Q to calculate a next new offset candidate point B (a second offset candidate point).

The offset updating unit 24 overwrites the newly calculated new offset candidate point B (or an average value of a plurality of calculated new offset candidate points B) by the offset calculation unit 23 in the offset recording unit 22. By repeating the above series of processes, an offset of the azimuth sensor 1 which is continuously changed temporally and spatially may be quickly and continually canceled, and thus, an azimuth may be precisely detected.

Further, for the two data points referred to in calculating the new offset candidate point B when a distance between the two points is shorter than a predetermined value, the offset calculation unit 23 may not calculate the new offset candidate point B from the data points being referred to or may discard the new offset candidate point B calculated from the data points being referred to. As the distance between data points as reference targets is shorter than the predetermined value, the reliability of the reference line F11 may be lost. Thus, by stopping the calculation of the new offset candidate point B based on the uncertain reference line F11 or discarding the calculation result, the precision of offset calculation may be increased.

Also, when a distance between the reference line F11 and the old offset point A is longer than a predetermined threshold value d1, the offset calculation unit 23 may not calculate the new offset candidate point B from the data points being referred to, discard the new offset candidate point B calculated from the data points being referred to, or set the movement distance d of the old offset point A shorter than that at normal times when the new offset candidate point B is calculated. Using such an algorithm, the new offset candidate point B is not excessively distant from the old offset point A, and thus, the stability of the azimuth detection may be enhanced.

Also, when the distance between the reference line F11 and the old offset point A is shorter than a predetermined threshold value d2 (where d2<d1), the offset calculation unit 23 calculates the new offset candidate point B at the first frequency, and when the distance between the reference line F11 and the old offset point A is longer than the threshold value d2, the offset calculation unit 23 calculates the new offset candidate point B at second frequency higher than the first frequency. Using such an algorithm, the offset calculation and updating are performed at a high frequency as much as the reference line F11 is away from the old offset point A, and thus, an offset of the azimuth sensor 1 may be canceled at a high speed.

Also, as the old offset point A (which is here also referred to as an initial offset point C for the convenience of description) referred to when the new offset candidate point B is initially calculated, C(0,0) may be recorded in the offset recording unit 22 at the time when the azimuth sensor 1 is released from the factory. Alternatively, the initial offset point C may be temporarily calculated under a test environment in which an external magnetic field is blocked, and the calculation result may be recorded in the offset recording unit 22.

Figure 3:
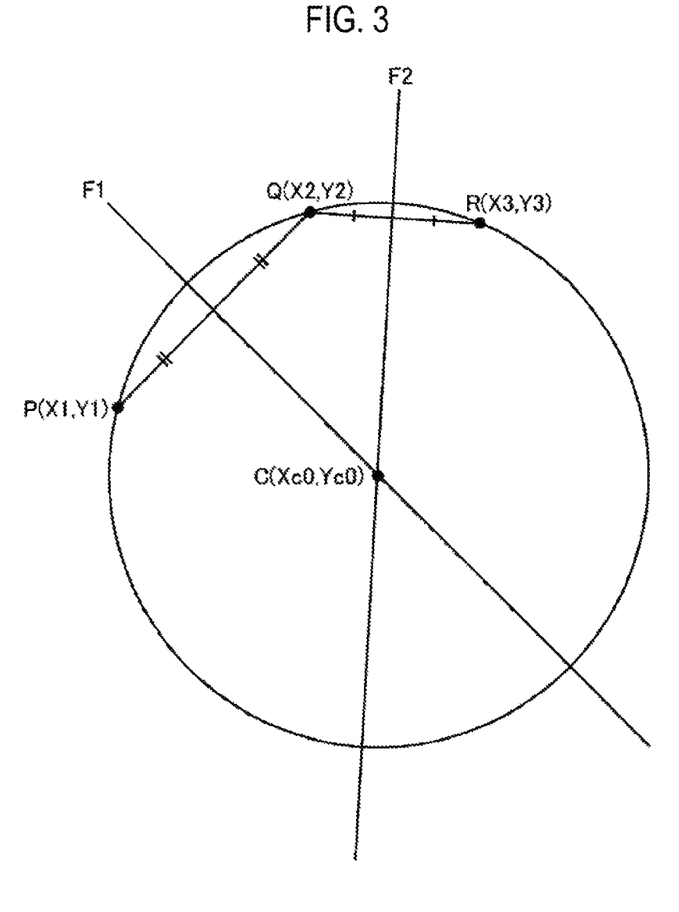
FIG. 3 is an XY plane view illustrating an example of an initial offset calculation method.

FIG. 3 is an XY plane view illustrating an example of a method for calculating the initial offset point C. In order to calculate the initial offset point C, three data points P, Q, and R may be sequentially obtained, and thereafter, for example, a straight line F1 connecting points at equal distances from point P and point Q and a straight line F2 at equal distances from the point Q and point R are calculated, and an intersection point of the straight line F1 and the straight line F2 may be determined as the initial offset point C (Xc0, Yc0).

<Second Embodiment>

Figure 4:
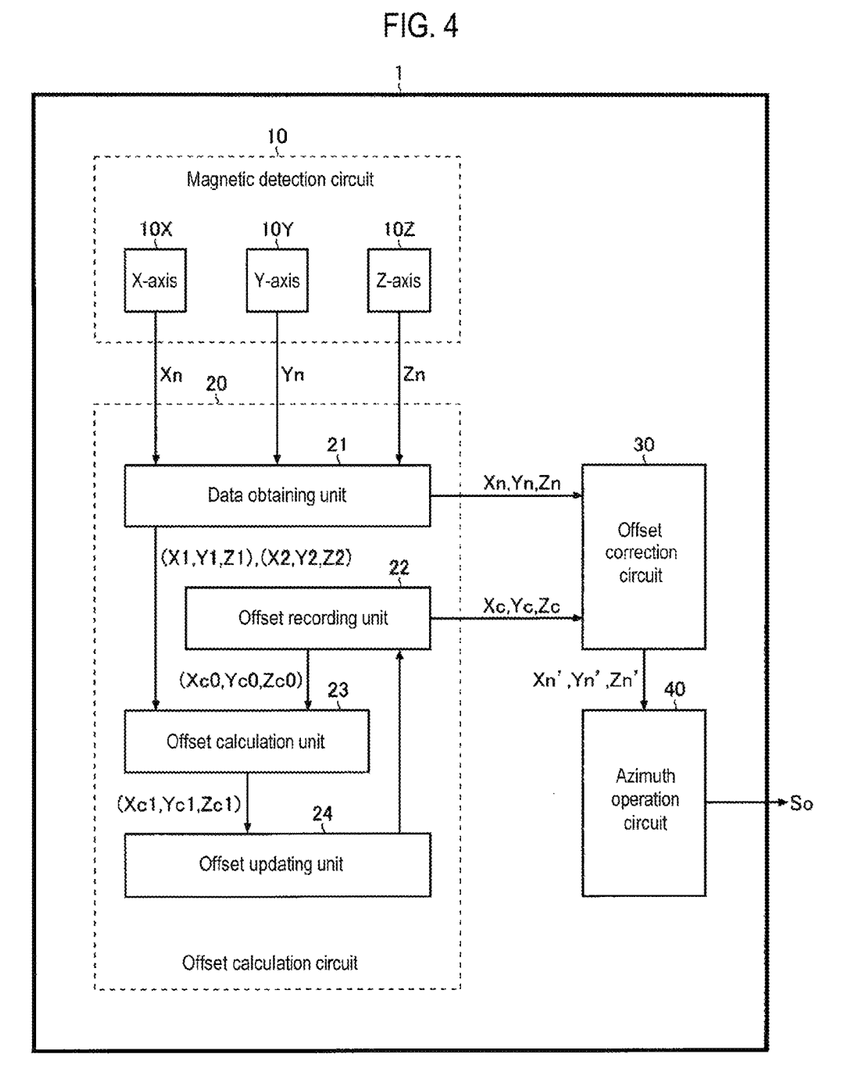
FIG. 4 is a block diagram illustrating a second embodiment of the azimuth sensor 1.

FIG. 4 is a block diagram illustrating a second embodiment of the azimuth sensor 1. The second embodiment basically has the same configuration as that of the first embodiment, and a magnetic sensor 10Z for detecting magnetism in a Z axis direction to generate magnetic detection data Zn is newly added as a component of the magnetic detection circuit 10. Also, the Z axis may be designed to be perpendicular to the X axis and the Y axis.

The offset calculation circuit 20 includes a data obtaining unit 21, an offset recording unit 22, an offset calculation unit 23, and an offset updating unit 24, like the first embodiment, and calculates offsets of the magnetic detection circuit 10 (offset components Xc, Yc, and Zc respectively included in three-axis magnetic detection data Xn, Yn, and Zn).

The data obtaining unit 21 obtains the three-axis magnetic detection data Xn, Yn, and Zn as a data point (Xn, Yn, Zn) of a three-axis coordinate system.

The offset recording unit 22 records the three-axis offset components Xc, Yc, and Zc as an offset point (Xc, Yc, Zc) of the three-axis coordinate system in a non-volatile manner.

The offset calculation unit 23 calculates a reference plane F21 dividing two points (X1, Y1, Z1) and (X2, Y2, Z2) among sequentially obtained data points (Xn, Yn, Zn), and then moves an old offset point (Xc0, Yc0, Zc0) recorded in the offset recording unit 22 in a direction toward the reference plane F21, thereby calculating a new offset candidate point (Xc1, Yc1, Zc1). Also, the offset calculation method will be described in detail later.

The offset updating unit 24 overwrites the new offset candidate point (Xc1, Yc1, Zc1) (or an average value of a plurality of calculated new offset candidate points) in the offset recording unit 22.

The offset correction circuit 30 corrects the magnetic detection data Xn, Yn, and Zn using offset information (offset components Xc, Yc, and Zc) read from the offset recording unit 22, thereby generating offset-corrected magnetic detection data Xn'(=Xn−Xc), Yn'(=Yn−Yc), and Zn' (=Zn−Zc).

The azimuth operation circuit 40 generates azimuth data So from the offset-corrected magnetic detection data Xn', Yn', and Zn'.

Figure 5:
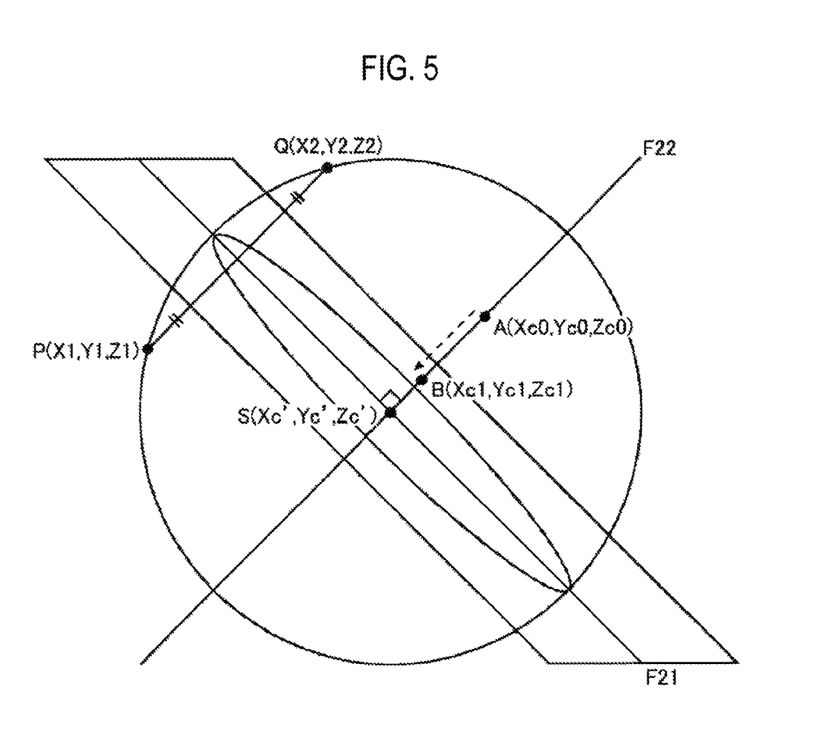
FIG. 5 is an XYZ coordinate space diagram illustrating a second example of the offset calculation method.

FIG. 5 is an XYZ coordinate space diagram illustrating a second example of the offset calculation method of the offset calculation unit 23.

In an offset calculation according to the second example, first, certain two points (here, point P(X1,Y1, Z1) and point Q(X2,Y2, Z2)) among sequentially obtained data points (Xn, Yn, Zn) are selected.

Next, a reference plane F21 dividing the point P and the point Q is calculated. For example, the reference plane F21 may be a plane connecting points at equal distances from the point P and the point Q. In this case, the reference plane F21 may be calculated using the following Eq. (3a) or (3b). Also, Eq. (3b) is an equation obtained by simplifying Eq. (3a).

$$(X - X1)^2 + (Y - Y1)^2 + (Z - Z1)^2 = \qquad \text{Eq. (3a)}$$
$$(X - X2)^2 + (Y - Y2)^2 + (Z - Z2)^2 \Leftrightarrow$$
$$(X2 - X1) \cdot \left[X - \frac{X1 + X2}{2}\right] + (Y2 - Y1) \cdot \left[Y - \frac{Y1 + Y2}{2}\right] +$$
$$(Z2 - Z1) \cdot \left[Z - \frac{Z1 + X2}{2}\right] = 0$$

$$|X - X1| + |Y - Y1| + |Z - Z1| = |X - X2| + |Y - Y2| + |Z - Z2| \qquad \text{Eq. (3b)}$$

The reference plane F21 may be easily calculated by using the above Eq. (3a) or (3b). However, the reference plane F21 may not necessarily be a plane, and may be a curved surface as long as it is put between the point P and the point Q.

Thereafter, a straight line F22 which passes through the old offset point A (Xc0, Yc0, Zc0) recorded in the offset recording unit 22 and is perpendicular to the reference plane F21 is calculated. Also, the straight line F22 may be easily calculated using Eq. (4) as follows:

$$\frac{X - Xc0}{X2 - X1} = \frac{Y - Yc0}{Y2 - Y1} = \frac{Z - Zc0}{Z2 - Z1} \qquad \text{Eq. (4)}$$

Thereafter, a new offset candidate point B (Xc1, Yc1, Zc1) is calculated by moving the old offset point A in a direction toward the reference plane F21.

For example, an intersection point S(Xc', Yc', Zc') between the reference plane F21 and the straight line F 22 is calculated, and a segment SA determined by this intersection point S and the old offset point A may be divided by m:n to calculate a new offset candidate point B.

Alternatively, the new offset candidate point B may also be calculated by moving the old offset point A toward the intersection point S by a movement distance d on the straight line F22. Also, when a distance between the old offset point A and the intersection point S is D, the movement distance d may be set within a range of 0<d<2D. That is, the new offset candidate point B may not necessarily be present in the segment SA, and may be set in a region beyond the reference plane F 21.

More generally speaking, the new offset candidate point B may only need to exist in a region belonging to the sphere of the radius D around the intersection point S.

Thereafter, the offset calculation unit 23 repeatedly calculates a new offset candidate point B by newly referring two data points in which at least one point is different from two data points referred to in a previous time when the new offset candidate point B was calculated. For example, when the calculation of the new offset candidate point B is repeated within the shortest period, when the point Q and a point R are selected at a time when the third point R(X3, Y3, Z3) is obtained following the point P and the point Q, a next new offset candidate point B may be calculated.

The offset updating unit 24 overwrites the newly calculated new offset candidate point B (or an average value of a plurality of calculated new offset candidate points B) by the offset calculation unit 23 in the offset recording unit 22. By repeating the above series of processes, an offset of the azimuth sensor 1 which is continuously changed temporally and spatially may be quickly and continually canceled, and thus, an azimuth may be precisely detected.

Further, for the two data points referred to in calculating the new offset candidate point B, when a distance between the two points is shorter than a predetermined value, the offset calculation unit 23 may not calculate the new offset candidate point B from the data points being referred to or may discard the new offset candidate point B calculated from the data points being referred to. As the distance between data points as reference targets is shorter than the predetermined value, the reliability of the reference plane F21 may be lost. Thus, by stopping the calculation of the new offset candidate point B based on the uncertain reference plane F21 or discarding the calculation result, the precision of offset calculation may be increased.

Also, when a distance between the reference plane F21 and the old offset point A is longer than a predetermined threshold value d1, the offset calculation unit 23 may not calculate the new offset candidate point B from the data points being referred to, discard the new offset candidate point B calculated from the data points being referred to, or set the movement distance d of the old offset point A shorter than that at normal times when the new offset candidate point B is calculated. Using such an algorithm, the new offset candidate point B is not excessively distant from the old offset point A, and thus, the stability of the azimuth detection may be enhanced.

Also, when the distance between the reference plane F21 and the old offset point A is shorter than a predetermined threshold value d2 (where d2<d1), the offset calculation unit 23 calculates the new offset candidate point B at first frequency, and when the distance between the reference plane F21 and the old offset point A is longer than the threshold value d2, the offset calculation unit 23 calculates the new offset candidate point B at second frequency higher than the first frequency. Using such an algorithm, offset calculation and updating are performed at high frequency as much as the reference plane F21 is away from the old offset point A, and thus, an offset of the azimuth sensor 1 may be canceled at a high speed.

<Third Embodiment>

Figure 6:
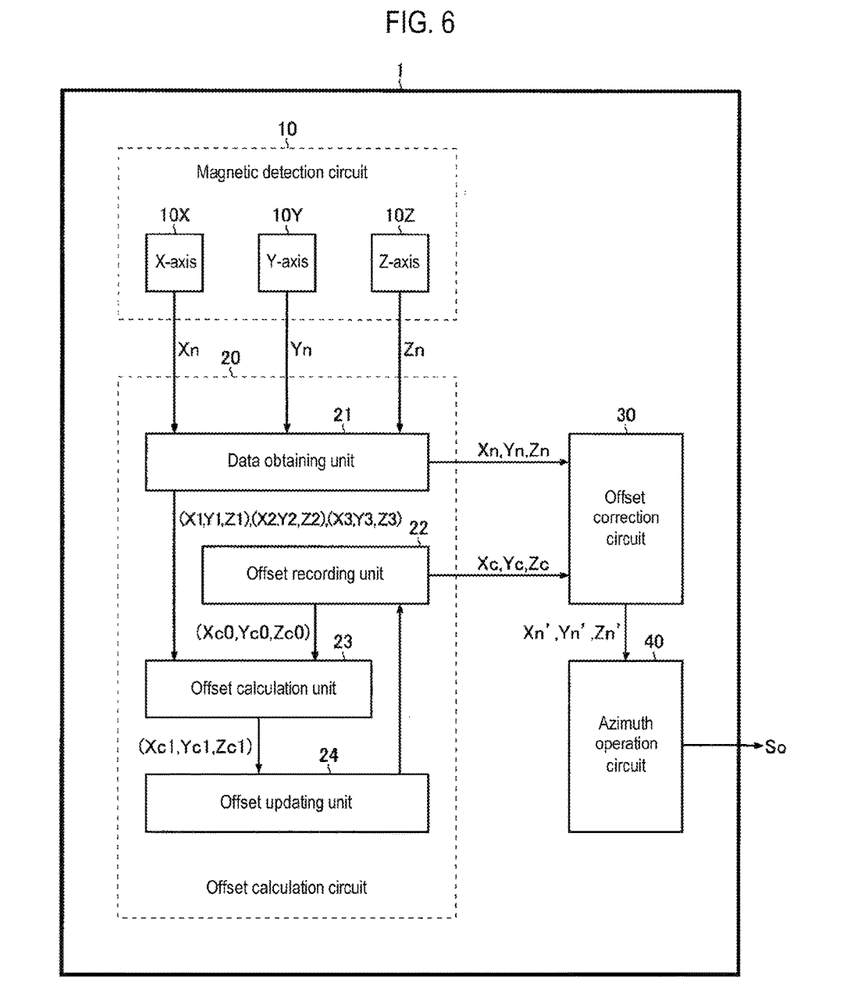
FIG. 6 is a block diagram illustrating a third embodiment of the azimuth sensor 1.

FIG. 6 is a block diagram illustrating a third embodiment of the azimuth sensor 1. The third embodiment basically has the same configuration as that of the second embodiment, except for an offset calculation method in the offset calculation circuit 20.

More specifically, the offset calculation unit 23 calculates a reference line F31 passing through a region surrounded by three points (X1,Y1, Z1), (X2,Y2, Z2), and (X3,Y3, Z3) among sequentially obtained data points (Xn, Yn, Zn), and then moves the old offset point (Xc0,Yc0, Zc0) recorded in the offset recording unit 22 in a direction toward the reference line F31, thereby calculating a new offset candidate point (Xc1,Yc1, Zc1). Hereinafter, the offset calculation method will be described in detail.

Figure 7:
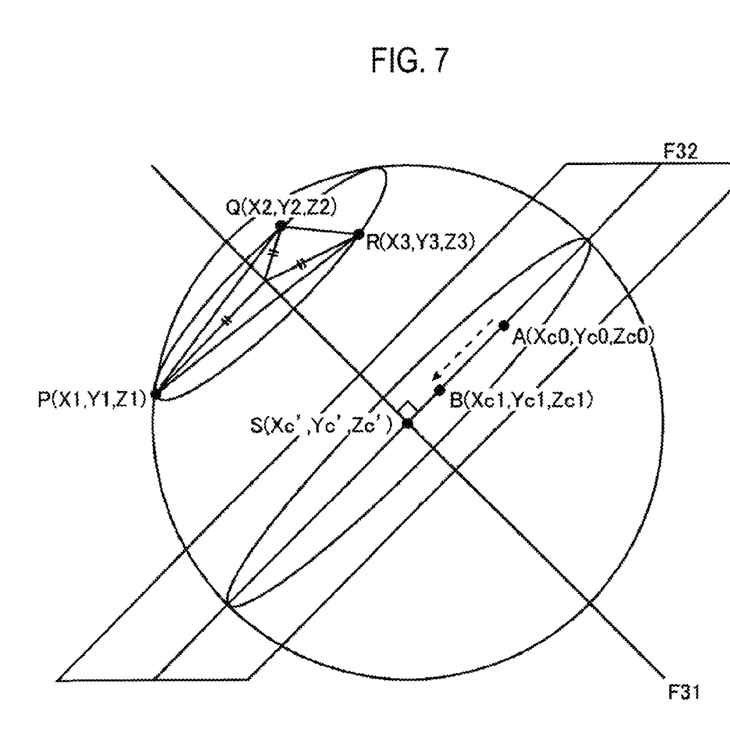
FIG. 7 is an XYZ coordinate space diagram illustrating a third example of the offset calculation method.

FIG. 7 is an XYZ coordinate space diagram illustrating a third example of the offset calculation method of the offset calculation unit 23.

In the offset calculation of the third example, first, certain three points (here, a point P (X1, Y1, Z1), a point Q (X2, Y2, Z2), and a point R (X3, Y3, Z3)) are selected from sequentially obtained data points (Xn, Yn, Zn).

Next, a reference line F31 passing through a region surrounded by the point P, the point Q, and the point R is calculated. For example, the reference line F31 may be a straight line connecting points at equal distances from the point P, the point Q, and the point R. In this case, the reference line F31 may be calculated by using the following Eq. (5a) or (5b). Also, the Eq. (5b) is an equation obtained by simplifying Eq. (5a).

$$(X-X1)^2+(Y-Y1)^2+(Z-Z1)^2 = \\ (X-X2)^2+(Y-Y2)^2+(Z-Z2)^2 = \\ (X-X3)^2+(Y-Y3)^2+(Z-Z3)^2 \quad \text{Eq. (5a)}$$

$$|X-X1|+|Y-Y1|+|Z-Z1| = \\ |X-X2|+|Y-Y2|+|Z-Z2| = |X-X3|+|Y-Y3|+|Z-Z3| \quad \text{Eq. (5b)}$$

The reference line F31 may be easily calculated using the above Eq. (5a) or (5b). However, the reference line F31 may not necessarily be a straight line, and may be a curved line as long as it passes through the region surrounded by the point P, the point Q, and the point R.

Thereafter, a plane F32 which passes through the old offset point A (Xc0, Yc0, Zc0) recorded in the offset recording unit 22 and is perpendicular to the reference line F31 is calculated. Also, the plane F32 may be easily calculated using Eq. (6) as follows:

$$(ax,ay,az)=(X2-X1,Y2-Y1,Z2-Z1)$$

$$(bx,by,bz)=(X3-X1,Y3-Y1,Z3-Z1)$$

$$(ay\cdot bz-az\cdot by)\cdot(X-Xc0)+(az\cdot bx-ax\cdot bz)\cdot(Y-Yc0)+ \\ (ax\cdot by-ay\cdot bx)\cdot(Z-Zc0)=0 \quad \text{Eq. (6)}$$

Thereafter, a new offset candidate point B (Xc1, Yc1, Zc1) are calculated by moving the old offset point A in a direction toward the reference line F31.

For example, an intersection point S (Xc', Yc', Zc') between the reference line F31 and the plane F32 is calculated, and a segment SA determined by the intersection point S and the old offset point A is divided by m:n, thereby calculating a new offset candidate point B.

Alternatively, the old offset point A may be moved toward the intersection point S by a movement distance d on the plane F32, thereby calculating a new offset candidate point B. Also, when a distance between the old offset point A and the intersection point S is D, a movement distance d may be set within a range of 0<d<2D. That is, the new offset candidate point B may not necessarily be present on the segment SA, and may be set in a region beyond the reference line F31.

More generally speaking, the new offset candidate point B may only need to exist in a region belonging to the sphere of the radius D around the intersection point S.

Thereafter, the offset calculation unit 23 repeatedly calculates a new offset candidate point B by newly referring three data points in which at least one point is different as three data points referred to in a previous time when the new offset candidate point B was calculated. For example, in a case in which the calculation of the new offset candidate point B is repeated within the shortest period, when the point Q, the point R, and a point T are selected at a time when the fourth point T (X4, Y4, Z4) is obtained following the point P, the point Q, and the point R, a next new offset candidate point B may be calculated.

The offset updating unit 24 overwrites the newly calculated new offset candidate point B (or an average value of a plurality of calculated new offset candidate points B) by the offset calculation unit 23 in the offset recording unit 22. By repeating the above series of processes, an offset of the azimuth sensor 1 which is continuously changed temporally and spatially may be quickly and continually canceled, and thus, an azimuth may be precisely detected.

Further, for the three data points referred to in calculating the new offset candidate point B, when a distance between at least two points is shorter than a predetermined value, the offset calculation unit 23 may not calculate the new offset candidate point B from the data points being referred to or may discard the new offset candidate point B calculated from the data points being referred to. As the distance between data points as reference targets is shorter than a predetermined value, the reliability of the reference line F31 may be lost. Thus, by stopping the calculation of the new offset candidate point B based on the uncertain reference line F31 or discarding the calculation result, the precision of offset calculation may be increased.

Also, when a distance between the reference line F31 and the old offset point A is longer than a predetermined threshold value d1, the offset calculation unit 23 may not calculate the new offset candidate point B from the data points being referred to, discard the new offset candidate point B calculated from the data points being referred to, or set the movement distance d of the old offset point A shorter than that at normal times when the new offset candidate point B is calculated. Using such an algorithm, the new offset candidate point B is not excessively distant from the old offset point A, and thus, the stability of the azimuth detection may be enhanced.

Also, when the distance between the reference line F31 and the old offset point A is shorter than a predetermined threshold value d2 (where d2<d1), the offset calculation unit 23 calculates the new offset candidate point B at first frequency, and when the distance between the reference line F31 and the old offset point A is longer than the threshold value d2, the offset calculation unit 23 calculates the new offset candidate point B at second frequency higher than the first frequency. Using such an algorithm, offset calculation and updating are performed at high frequency as much as the reference line F31 is away from the old offset point A, and thus, an offset of the azimuth sensor 1 may be canceled at a high speed.

<Applications to Electronic Device>

Figure 8:
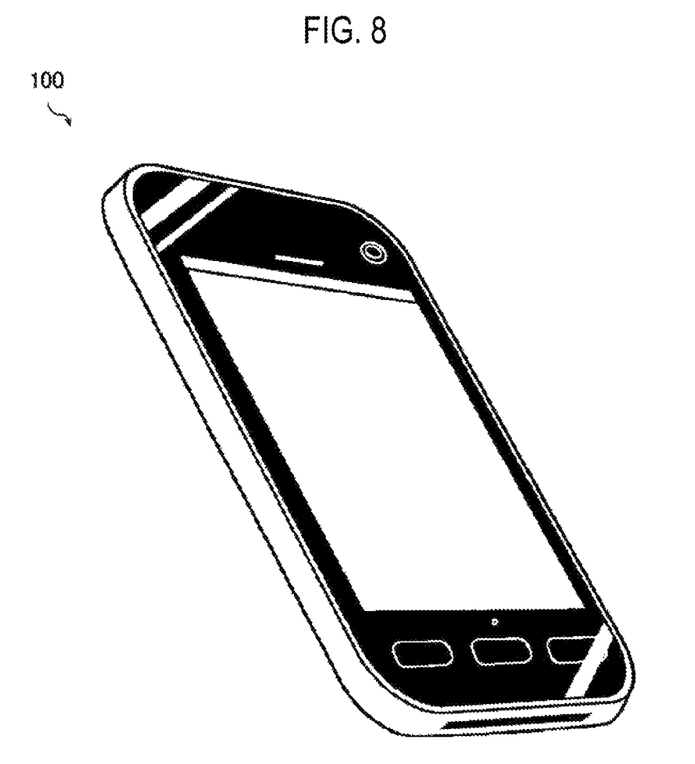
FIG. 8 is a view illustrating an outer appearance of a smartphone.

FIG. 8 is a view illustrating an outer appearance of a smartphone 100. The smartphone 100 is an example of an electronic device having the azimuth sensor 1. By mounting the azimuth sensor 1 described above as an electronic compass of the smartphone 100, a direction in which a user is oriented can be accurately detected. In particular, when a global positioning system (GPS) and an electronic compass are used together, position detection precision in a map application or a navigation application can be enhanced.

<Other Modifications>

Further, various technical features disclosed herein may be variously modified, in addition to the foregoing embodiments, without departing from the spirit of the present disclosure. That is, it should be understood that the embodiments are merely illustrative and not intended to limit the scope of the present disclosure, in all respects. The technical scope of the present disclosure is presented by claims, rather than the description of the embodiments, and thus, is to be understood to encompass all changes that fall within the meaning and range equivalent to the scope of the claims.

According to the present disclosure in some embodiments, it is possible to provide an offset calculation circuit capable of calculating an offset with a smaller amount of calculation than that of the related art, and an azimuth sensor using the same.

The present disclosure disclosed herein can be used in an azimuth sensor mounted on, for example, a smartphone, a tablet terminal, or the like.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An offset calculation circuit, comprising:
   a data obtaining unit connected to two or more magnetic sensors to sequentially obtain, from the two or more magnetic sensors, two-axis magnetic detection data as a set of data points for a two-axis coordinate system or three-axis magnetic detection data as a set of data points for a three-axis coordinate system, the two-axis or three-axis magnetic detection data being generated based on magnetism detected in two or more directions by the two or more magnetic sensors;
   an offset recording unit for recording offset components of the two-axis or three-axis magnetic detection data as an offset point of the two-axis coordinate system or the three-axis coordinate system; and
   an offset calculation unit for calculating a first reference line put between first and second data points among the set of data points for the two-axis coordinate system or a first reference plane put between first and second data points among the set of data points for the three-axis coordinate system, and subsequently moving the offset point recorded in the offset recording unit in a direction toward the first reference line or the first reference plane to calculate a first offset candidate point.

2. The offset calculation circuit of claim 1, wherein the first reference line or the first reference plane is a straight line or a flat plane connecting points at equal distances from the first and second data points.

3. The offset calculation circuit of claim 1, wherein the offset calculation unit calculates a second offset candidate point by referring to third and fourth data points among the set of data points, and one of the third and fourth data points is different from both of the first and second data points.

4. The offset calculation circuit of claim 3, wherein the offset calculation unit calculates a plurality of offset candidate points including the first and second offset candidate points based on the set of data points, and the offset calculation circuit further comprising
an offset updating unit for overwriting an average value of the plurality of offset candidate points in the offset recording unit.

5. The offset calculation circuit of claim 1, further comprising an offset updating unit for overwriting the first offset candidate point in the offset recording unit.

6. The offset calculation circuit of claim 3, wherein when a distance between third and fourth data points is shorter than a first predetermined value, the offset calculation unit does not calculate the second offset candidate point from the third and fourth data points or discards the second offset candidate point calculated from the third and fourth data points.

7. The offset calculation circuit of claim 1, wherein the offset calculation unit calculates a second reference line or a second reference plane put between third and fourth data points among the set of data points, and when a distance between the second reference line or the second reference plane and the offset point is longer than a second predetermined value, the offset calculation unit does not calculate a second offset candidate point from the third and fourth data points, discards the second offset candidate point calculated from the third and fourth data points, or sets a movement distance of the offset point in a direction toward the second reference line or the second reference plane shorter than a predetermined distance when calculating the second offset candidate point.

8. The offset calculation circuit of claim 1, wherein the offset calculation unit calculates a second reference line or a second reference plane put between third and fourth data points among the set of data points, and subsequently moves the offset point recorded in the offset recording unit in a direction toward the second reference line or the second reference plane to calculate a second offset candidate point, and wherein when a distance between the second reference line or the second reference plane and the offset point is shorter than a third predetermined value, the offset calculation unit calculates the second offset candidate point at a first frequency, and when the distance between the second reference line or the second reference plane and the offset point is longer than the third predetermined value, the offset calculation unit calculates the second offset candidate point at a second frequency higher than the first frequency.

9. An azimuth sensor, comprising:
a magnetic detection circuit including two or more magnetic sensors to generate two-axis magnetic detection data as a set of data points for a two-axis coordinate system or three-axis magnetic detection data as a set of data points for a three-axis coordinate system, based on magnetism detected in two or more directions;
an offset calculation circuit for calculating an offset of the magnetic detection data, the offset calculation circuit including:
a data obtaining unit for sequentially obtaining, from the two or more magnetic sensors, the two-axis magnetic detection data or the three-axis magnetic detection data;
an offset recording unit for recording offset components of the two-axis or three-axis magnetic detection data as an offset point of the two-axis coordinate system or the three-axis coordinate system; and
an offset calculation unit for calculating a first reference line put between first and second data points among the set of data points for the two-axis coordinate system or a first reference plane put between first and second data points among the set of data points for the three-axis coordinate system, and subsequently moving the offset point recorded in the offset recording unit in a direction toward the first reference line or the first reference plane to calculate a first offset candidate point;
an offset correction circuit for correcting the offset of the magnetic detection data; and
an azimuth operation circuit for generating azimuth data from the corrected magnetic detection data.

10. An electronic device comprising an azimuth sensor, the azimuth sensor comprising:
a magnetic detection circuit including two or more magnetic sensors to generate two-axis magnetic detection data as a set of data points for a two-axis coordinate system or three-axis magnetic detection data as a set of data points for a three-axis coordinate system, based on magnetism detected in two or more directions;
an offset calculation circuit for calculating an offset of the magnetic detection data, the offset calculation circuit including:
a data obtaining unit for sequentially obtaining, from the two or more magnetic sensors, the two-axis magnetic detection data or the three-axis magnetic detection data;
an offset recording unit for recording offset components of the two-axis or three-axis magnetic detection data as an offset point of the two-axis coordinate system or the three-axis coordinate system; and
an offset calculation unit for calculating a first reference line put between first and second data points among the set of data points for the two-axis coordinate system or a first reference plane put between first and second data among the set of data points for the three-axis coordinate system, and subsequently moving the offset point recorded in the offset recording unit in a direction toward the first reference line or the first reference plane to calculate a first offset candidate point;
an offset correction circuit for correcting the offset of the magnetic detection data; and
an azimuth operation circuit for generating azimuth data from the corrected magnetic detection data.

11. An offset calculation circuit, comprising:
a data obtaining unit connected to at least three magnetic sensors to sequentially obtain, from the at least three magnetic sensors, three-axis magnetic detection data as a set of data points for a three-axis coordinate system, the three-axis magnetic detection data being generated based on magnetism detected in three directions by the at least three magnetic sensors;

an offset recording unit for recording offset components of the three-axis magnetic detection data as an offset point of the three-axis coordinate system; and an offset calculation unit for calculating a first reference line passing through a first region surrounded by first, second, and third data points among the set of data points, and subsequently moving the offset point recorded in the offset recording unit in a direction toward the first reference line to calculate a first offset candidate point.

12. The offset calculation circuit of claim 11, wherein the first reference line is a straight line connecting points at equal distances from the first, second, and third data points.

13. The offset calculation circuit of claim 11, wherein the offset calculation unit calculates a second offset candidate point by referring to fourth, fifth, and sixth data points among the set of data points, and one of the fourth, fifth, and sixth data points is different from all of the first, second, and third data points.

14. The offset calculation circuit of claim 13, wherein the offset calculation unit calculates a plurality of offset candidate points including the first and second offset candidate points based on the set of data points, the offset calculation circuit further comprising an offset updating unit for overwriting an average value of the plurality of offset candidate points in the offset recording unit.

15. The offset calculation circuit of claim 11, further comprising an offset updating unit for overwriting the first offset candidate point in the offset recording unit.

16. The offset calculation circuit of claim 13, when a distance between two points of the fourth, fifth, and sixth data points is shorter than a first predetermined value, the offset calculation unit does not calculate the second offset candidate point from the fourth, fifth, and sixth data points or discards the second offset candidate point calculated from the fourth, fifth, and sixth data points.

17. The offset calculation circuit of claim 11, wherein the offset calculation unit calculates a second reference line passing through a second region surrounded by fourth, fifth, and sixth data points among the set of data points, and when a distance between the second reference line and the offset point is longer than a second predetermined value, the offset calculation unit does not calculate a second offset candidate point from the fourth, fifth, and sixth data points, discards the second offset candidate point calculated from the fourth, fifth, and sixth data points, or sets a movement distance of the offset point in a direction toward the second reference line shorter than a predetermined distance when calculating the second offset candidate point.

18. The offset calculation circuit of claim 11, wherein the offset calculation unit calculates a second reference line passing through a second region surrounded by fourth, fifth, and sixth data points among the set of data points, and subsequently moves the offset point recorded in the offset recording unit in a direction toward the second reference line to calculate a second offset candidate point, wherein when a distance between the second reference line and the offset point is shorter than a third predetermined value, the offset calculation unit calculates the second offset candidate point at a first frequency, and when the distance between the second reference line and the offset point is longer than the third predetermined value, the offset calculation unit calculates the second offset candidate point at a second frequency higher than the first frequency.

19. An azimuth sensor, comprising:

a magnetic detection circuit including at least three magnetic sensors to generate three-axis magnetic detection data as a set of data points for a three-axis coordinate system, based on magnetism detected in three directions;

an offset calculation circuit for calculating an offset of the magnetic detection data, the offset calculation circuit including;

a data obtaining unit for sequentially obtaining, from the at least three magnetic sensors, the three-axis magnetic detection data;

an offset recording unit for recording offset components of the three-axis magnetic detection data as an offset point of the three-axis coordinate system; and an offset calculation unit for calculating a first reference line passing through a first region surrounded by first, second, and third data points among the set of data points, and subsequently moving the offset point recorded in the offset recording unit in a direction toward the first reference line to calculate a first offset candidate point;

an offset correction circuit for correcting the offset of the magnetic detection data; and an azimuth operation circuit for generating azimuth data from the corrected magnetic detection data.

20. An electronic device comprising an azimuth sensor, the azimuth sensor comprising:

a magnetic detection circuit including at least three magnetic sensors to generate three-axis magnetic detection data as a set of data points for a three-axis coordinate system, based on magnetism detected in three directions;

an offset calculation circuit for calculating an offset of the magnetic detection data, the offset calculation circuit including;

a data obtaining unit for sequentially obtaining, from the at least three magnetic sensors, the three-axis magnetic detection data;

an offset recording unit for recording offset components of the three-axis magnetic detection data as an offset point of the three-axis coordinate system; and an offset calculation unit for calculating a first reference line passing through a first region surrounded by first, second, and third data points among the set of data points, and subsequently moving the offset point recorded in the offset recording unit in a direction toward the first reference line to calculate a first offset candidate point;

an offset correction circuit for correcting the offset of the magnetic detection data; and an azimuth operation circuit for generating azimuth data from the corrected magnetic detection data.

* * * * *